United States Patent [19]
Cho

[11] Patent Number: 6,148,353
[45] Date of Patent: *Nov. 14, 2000

[54] PORTABLE COMPUTER SYSTEM HAVING AND A METHOD FOR AN AUDIO EXPANSION CONTROL FUNCTION

[75] Inventor: Hwan-Cheol Cho, Suwon, Rep. of Korea

[73] Assignee: SamSung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/958,258

[22] Filed: Oct. 27, 1997

[30]  Foreign Application Priority Data

Oct. 29, 1996 [KR] Rep. of Korea ................. 96-49737

[51] Int. Cl.[7] ........................................ G06F 13/00
[52] U.S. Cl. ..................... 710/101; 710/102; 700/94
[58] Field of Search ................. 395/892, 282, 395/283, 281; 361/686, 683; 248/442.2; 710/101, 102, 103, 72; 700/94

[56]  References Cited

U.S. PATENT DOCUMENTS

| | | | |
|---|---|---|---|
| 5,323,291 | 6/1994 | Boyle et al. | 361/683 |
| 5,526,493 | 6/1996 | Shu . | |
| 5,598,537 | 1/1997 | Swanstrom et al. . | |
| 5,598,539 | 1/1997 | Gephardt et al. . | |
| 5,630,175 | 5/1997 | Gajewski et al. | 395/892 |
| 5,632,020 | 5/1997 | Gephardt et al. | 395/283 |
| 5,671,366 | 9/1997 | Niwa et al. . | |
| 5,681,200 | 10/1997 | Shecter | 446/76 |
| 5,683,070 | 11/1997 | Seed | 248/442.2 |
| 5,805,412 | 9/1998 | Yanagisawa et al. | 361/686 |
| 5,812,369 | 9/1998 | Hsu et al. | 361/683 |
| 5,826,042 | 10/1998 | Kirkendoll | 395/281 |

*Primary Examiner*—Ayaz R. Sheikh
*Assistant Examiner*—Tim Vo
*Attorney, Agent, or Firm*—Robert E. Bushnell, Esq.

[57]  ABSTRACT

An audio expansion system for enhancing sound reproduction function of the portable computer includes a digital audio processing chip, a first audio amplifier provided in the portable computer and a second audio amplifier provided in the docking station. These two amplifiers amplify the audio output signal fed from the audio chip. A controller is provided for detecting the presence of the docking station, and in response thereto outputs a signal which disables the first audio amplifier. This controller activates a switch that turns off the first audio amplifier. Also, the presence of the docking station is determined by a signal having a voltage level representative of the presence of said second audio amplifier. Thus, a simple audio processing circuit is provided so as to eliminate the duplicated audio chip in the docking station. Further, by detecting the presence of the docking station, automatic turn off of the host audio amplifier is possible, thereby providing a stable control system without using a software control program.

13 Claims, 4 Drawing Sheets

PORTABLE COMPUTER SYSTEM HAVING AND A METHOD FOR AN AUDIO EXPANSION CONTROL FUNCTION

CLAIM OF PRIORITY

This application makes reference to, incorporates the same herein, and claims all benefits accruing under 35 U.S.C. §119 from an application for A PORTABLE COMPUTER SYSTEM HAVING AUDIO EXPANSION CONTROL FUNCTION earlier filed in the Korean Industrial Property Office on Oct. 29, 1996 and there duly assigned Serial No. 49737/1996.

FIELD OF THE INVENTION

The present invention relates to computer expansion devices, and, more particularly, to an audio expansion system for portable computers operated with a docking station.

BACKGROUND OF THE INVENTION

Recently, portable or notebook computers have become a popular alternative to traditional desktop computers in terms of their movability, simplicity, and various functions. Further, various expansion devices have been developed for enabling the notebook computers to extend battery life as well as perform a multimedia function. This is to overcome inherent functional limitations of the notebook computer due to its reduced size and limited battery life. Those expansion devices, for example, external speakers, external CD-ROM drives, external batteries, etc. are often incorporated into an apparatus, called a docking station, that is arranged for a specific notebook computer.

In an earlier portable computer arrangement, a notebook computer having small internal speakers is coupled to a docking station through a docking connector. The docking station has relatively high power speakers in order to perform multimedia presentations with a high quality sound reproduction.

In such an earlier portable computer arrangement, the notebook computer includes a sound source and an audio chip and an audio amplifier and a speaker while the docking station includes an additional audio chip, an audio amplifier, and another speaker. The docking connector is disposed between the output of the sound source of the host computer and the input of the docking station audio chip. Exemplars of such designs during recent years include those found in U.S. Pat. No. 5,671,366 to Niwa et al., entitled Operating System Optimization To Permit Use Of A First Unit With A Second Unit To Extend The Functionality Of The First, U.S. Pat. No. 5,526,493 to Shu, entitled Docking Detection And Suspend Circuit For Portable Computer/Expansion Chassis Docking System, U.S. Pat. No. 5,598,537 to Swanstrom et al., entitled Apparatus And Method For Driving A Bus To A Docking Safe State In A Dockable Computer System Including A Docking Station And A Portable Computer, U.S. Pat. No. 5,598,539 to Gephardt et al., entitled Apparatus And Method For Achieving Hot Docking Capabilities For A Dockable Computer System, U.S. Pat. No. 5,632,020 to Gephardt et al., entitled System For Docking A Portable Computer To A Host Computer Without Suspending Processor Operation By A Docking Agent Driving The Bus Inactive During Docking, and U.S. Pat. No. 5,630,175 to Gajewski et al., entitled Surround Sound System For General Purpose Computer Using Dual Sound Cards.

Digital sound data from the sound source of the computer is supplied to the host audio chip when the computer is separated from the docking station. The audio chip converts input digital sound data into analog audio signals which are supplied to the audio amplifier. The amplified audio output is supplied to the small internal speaker. The audio output of the audio amplifier of the computer is set to a low level so that it can be matched to the small low power internal speaker.

On the other hand, when the notebook computer is coupled to the docking station, the computer system controls the input of the host audio chip to disable the operation of the audio chip and the digital sound data of the sound source is supplied to the additional audio chip provided in the docking station through the docking connector. Converted analog audio signals are supplied to the station audio amplifier and the thus amplified audio output is supplied to the high power speaker of the docking station. Since the audio chips are duplicated unnecessarily in both the computer and the docking station, it would be desirable for the audio chip in the docking station to be eliminated such that the audio chip in the portable computer is used when the portable computer is coupled to the docking station to enhance sound reproduction.

SUMMARY OF THE INVENTION

It is therefore an object of the invention to provide an improved audio expansion system.

It is another object to provide an audio expansion system which can avoid duplication of audio chips provided in the portable computer and docking station.

In accordance with the principles of the present invention, the audio expansion system includes a first audio amplifier provided in the portable computer for amplifying an audio output signal fed from an audio chip; a second audio amplifier provided in the docking station for amplifying the audio output signal fed from the audio chip; and a controller for disabling said first audio amplifier in response to a signal fed from the docking station.

Further, a docking connector is provided between the portable computer and the docking station, in which the audio output signal and the signal from the docking station are transferred through signal lines of the docking connector. Preferably, the signal from the docking station has a voltage level representative of the presence of the second audio amplifier. Also, the controller includes a switch for turning the first audio amplifier on and off in response to the output level of the controller. Further, the controller includes a microprocessor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
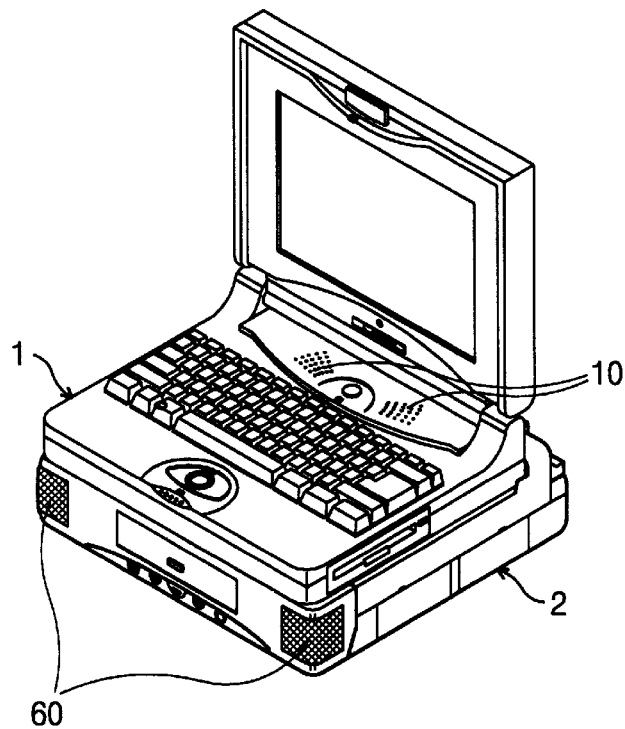
FIG. 1 is a perspective view showing a notebook computer incorporated into a docking station having external speakers.
Figure 2:
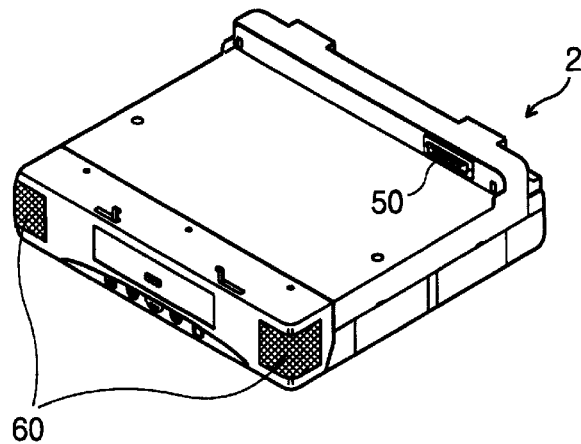
FIG. 2 is a perspective view of the docking station of FIG. 1 showing a docking connector.

Turning now to the drawings, FIG. 1 shows a configuration of an earlier portable computer, incorporating the docking station provided for enhancing the sound reproduction function of the portable computer. In the drawing, a notebook computer 1 having small internal speakers 10 is coupled to a docking station 2 through a connector 50 (see FIG. 2). The docking station 2 has relatively high power speakers 60 in order to perform multimedia presentations with high quality sound reproduction.

Figure 3:
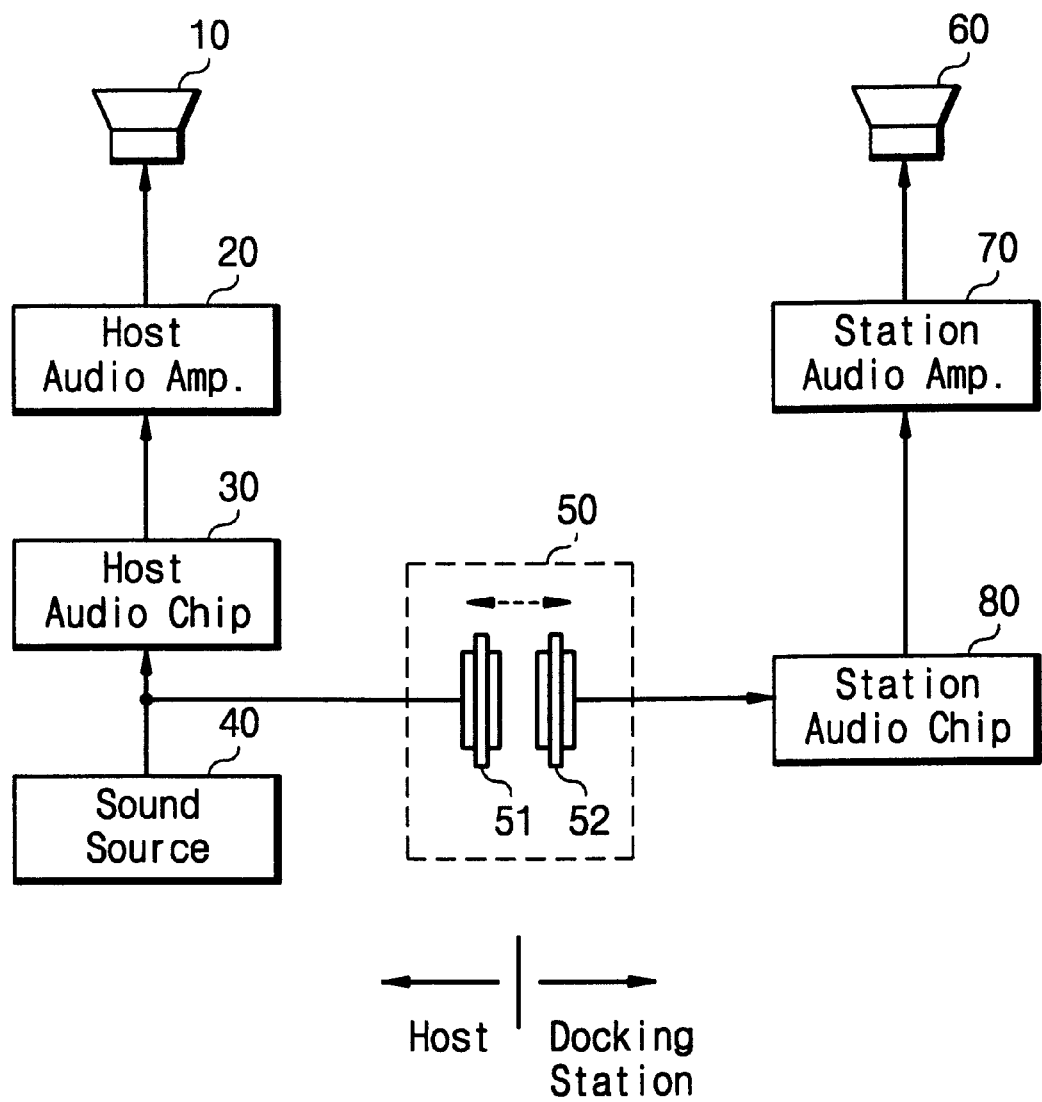
FIG. 3 is a block diagram showing an earlier audio expansion system provided in a portable computer incorporated into a docking station.

Also, an earlier audio processing circuit provided in the computer 1 and the docking station 2 is schematically shown in FIG. 3. There, at the host side, the audio processing circuit includes a sound source 40, an audio chip 30, an audio amplifier 20 and a speaker 10. Further, at the station side, an audio chip 80, an audio amplifier 70, and a speaker 60 are provided. A docking connector 50 is disposed between the output of the sound source 40 and the input of the station audio chip 80. The docking connector 50 may consist of two connectors 51 and 52 which can be engaged with each other when the computer and the docking station are coupled.

Digital sound data at the sound source 40 of the computer is supplied to the host audio chip 30 when the computer 1 is separated from the docking station 2. The audio chip 30 converts input digital sound data into analog audio signals that will be supplied to the audio amplifier 20. An amplified audio output is supplied to the internal speaker 10. This audio output is set to low level so that it can be matched to the small low power internal speaker 10. Meanwhile, when the notebook computer 1 is coupled to the docking station 2, the computer system controls the input of the host audio chip 30 to disable the operation of the audio chip 30. Thus, digital sound data of the sound source 40 is supplied to the audio chip 80 provided in the docking station through the connector 50. Converted analog audio signals are supplied to the station audio amplifier 70 and thus amplified audio output is supplied to the high power external speaker 60.

These audio chips 30 and 80 provided in the computer and docking station generally use digital signal processors (DSPs). Examples of digital signal processors are Texas Instruments Part Nos. TMS320M500 and TMS320M520 that incorporate interface circuits to link to the ISA bus, telephone lines, microphones, and speakers. Audio chips 80 however, may be a duplication if the sound generated by the portable computer is merely amplified and reproduced through the speaker 60 of the docking station. Thus, it is desirable that the audio chip 80 in the docking station be eliminated and the audio chip 30 in the portable computer be used when the portable computer is coupled to the docking station to enhance sound reproduction.

Figure 4:
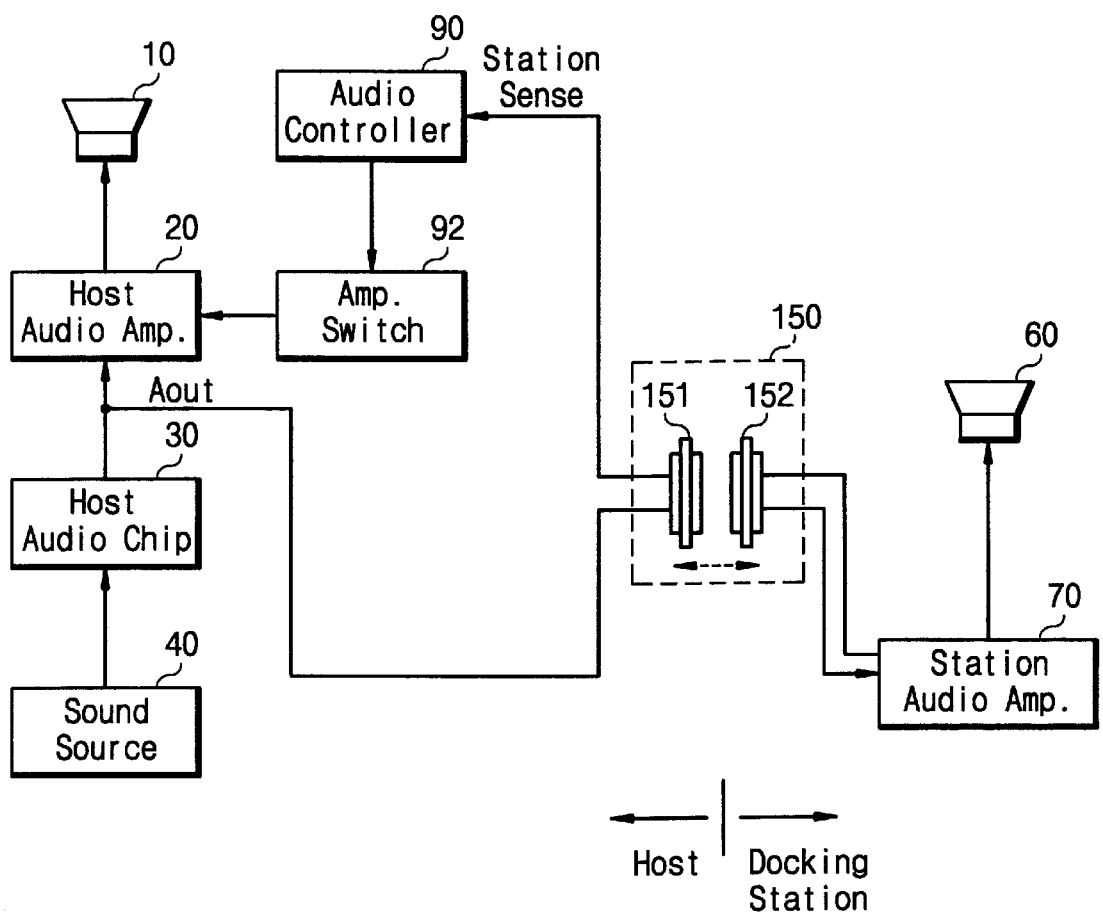
FIG. 4 is a block diagram showing an audio expansion system provided in a portable computer with a docking station in accordance with the principles of the present invention.

Referring to FIG. 4, there is shown an audio expansion system provided in a portable computer incorporating a docking station in accordance with the present invention. In the drawing, the functional blocks and components which are the same as or similar to those shown in FIG. 3 are denoted by the same reference numerals. The audio expansion system includes an audio processing circuit consisting of a sound source 40, an audio chip 30, an audio amplifier 20 and a speaker 10 at the portable computer side. The audio expansion system further includes an audio controller 90 and an amplifier switch 92. At the docking station, included are a station audio amplifier 70 and a high power speaker 60.

The audio controller 90 preferably includes a microprocessor which produces a switching signal for selectively driving the host audio amplifier 20 in response to an input signal.

Again, the audio chip 30 provided in the portable computer uses Digital Signal Processors (DSPs), and incorporates interface circuits to link to the ISA bus, telephone lines, microphones, and speakers.

An output of the audio chip 30 provided in the portable computer is connected to the host audio amplifier 20 and also coupled to the station audio amplifier 70 through a docking connector 150. This docking connector 150 is similar in construction to the connector 50 of FIG. 3, and includes two connectors 151 and 152 capable of being connected when the portable computer is incorporated with the docking station. A signal line is provided between one input of the audio controller 90 and an output terminal of the station audio amplifier 70 via the docking connector 150. The output terminal of the amplifier 70 can be a ground terminal or a preset voltage terminal so that the voltage level signal may be supplied to the input of the audio controller 90 through the docking connector 150.

The audio controller 90 detects the presence of the docking station by sensing the voltage level of the signal line. In response to the docking station sense signal, the controller 90 outputs a driving signal that turns off the amplifier switch 92 of the host audio amplifier 20. Thus, the host audio amplifier 20 is disabled and reproduction of sound in the speaker 10 is disabled. Rather, the audio output signal Aout of the host audio chip 30 is supplied via the docking connector 150 to the station audio amplifier 70. There, at the docking station, high level audio amplification is performed and sound reproduction can be effected by the speaker 60.

Figure 5:
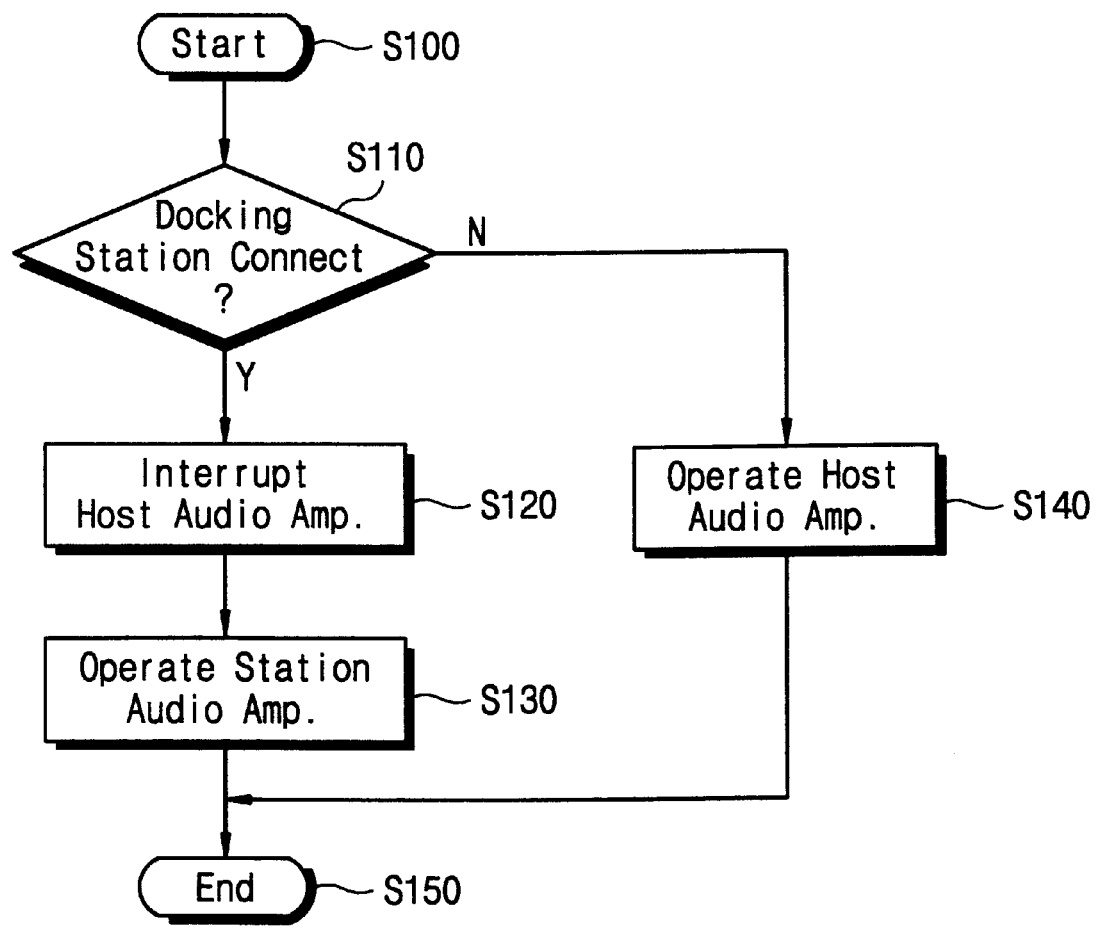
FIG. 5 is a flowchart illustrating the operation of the audio controller shown in FIG. 4.

Operation of the audio controller 90 will be described in detail with reference to the flowchart of FIG. 5. First, when the portable computer has started and finished the booting process, the audio controller 90 determines whether or not the docking station is connected to the host computer, at step S110. If the audio controller 90 detects the station sense signal fed from the station audio amplifier 70, it produces a driving signal that shuts off the host audio amplifier switch 92. Thus, operation of the host audio amplifier 20 is interrupted at step S120.

Meanwhile, if the docking station is not coupled to the portable computer and the station sense signal is not supplied to the audio controller 90, the driving signal is activated to turn on the host audio amplifier switch 92. With this, the host audio amplifier 20 is operated to produce sound via the speaker 10 at step S140. When the operation of the host audio amplifier 20 is interrupted at step S120, the sound amplification is performed by the station audio amplifier 70 and the sound reproduction via the speaker 60 is effected at step S130.

As should be apparent from the foregoing, the present invention provides a simple audio expansion system adopted in the portable computer by eliminating a duplicated audio processing chip in the docking station. Further, by detecting the presence of the docking station, an automatic cut-off of the host audio amplifier is possible, thereby providing a stable audio expansion control system without using a software control program. Also, the required level of the sound amplification as well as high quality sound reproduction can be performed by the audio amplifier 70 and the speaker 60 provided in the docking station.

While the embodiments of the invention have been described in terms of an exemplary embodiment, it is contemplated that it may be practiced as outlined above with modifications within the spirit and scope of the appended claims.

What is claimed is:

1. An audio expansion system for a portable computer having an audio processing circuit and an internal speaker, wherein a docking station having an extra speaker is incorporated for enhancing sound reproduction, the audio expansion system comprising:

a first audio amplifier and an audio chip, both disposed in said portable computer, said first audio amplifier amplifying an audio output signal fed from said audio chip;

a second audio amplifier disposed in said docking station, said second audio amplifier amplifying said audio output signal fed from said audio chip; and a controller for selectively disabling said first audio amplifier in response to a signal fed from said docking station so that said audio output signal is fed from said audio chip in said portable computer to said second audio amplifier and is then only amplified by said second audio amplifier in said docking station.

2. The audio expansion system according to claim 1, further comprising a docking connector connected when said portable computer is operationally incorporated into said docking station, said audio output signal and said signal from said docking station being transferred through signal lines of said docking connector.

3. The audio expansion system according to claim 1, further comprised of said signal from said docking station having a voltage level representative of the presence of said second audio amplifier.

4. The audio expansion system according to claim 1, further comprised of said controller comprising a switch for selectively turning said first audio amplifier on and off in response to a driving signal of said controller.

5. The audio expansion system according to claim 1, further comprised of said controller comprising a microprocessor.

6. The audio expansion system according to claim 1, further comprised of said audio chip comprising a digital signal processor.

7. A computer system including a portable computer and a docking station, comprising:

said portable computer comprising:

a sound source for generating a digital audio signal output;

a host audio chip for receiving said digital audio signal output of said sound source and for converting said digital audio signal output into an analog audio output;

a host audio amplifier for amplifying said analog audio output of said host audio chip;

a host speaker connected to an output of said host audio amplifier and providing an audible sound output corresponding to said analog audio output of said host audio chip;

an audio controller and an amplifier switch connected to said host audio amplifier for selectively turning said host audio amplifier on and off in accordance with a station sense signal input to said audio controller so that said analog audio output from said host audio chip in said portable computer is then only amplified by an audio amplifier in said docking station; and a host docking connector for receiving said station sense signal from said docking station and for providing said analog audio output from said host audio chip to said docking station; and said docking station comprising:

a docking station docking connector operationally connecting said docking station to said host docking connector, for transmitting said station sense signal to said portable computer and for receiving from said portable computer said analog audio output of said host audio chip;

a station audio amplifier for providing said station sense signal to said docking station docking connector and for receiving and amplifying said analog audio output of said host audio chip; and a station speaker connected to an output of said station audio amplifier and providing an audible sound output corresponding to said analog audio output of said host audio chip.

8. A method of operating an audio expansion system for a portable computer, the method comprising the steps of:

mating a portable computer having an audio processing circuit including an audio chip and having an internal speaker with a docking station having an extra speaker;

driving selectively a first audio amplifier disposed in said portable computer to amplify an audio output signal fed from said audio chip in said portable computer;

driving a second audio amplifier disposed in said docking station to amplify said audio output signal fed from said audio chip in said portable computer; and providing a controller for selectively disabling said first audio amplifier in response to a signal fed from said docking station so that said audio output signal is fed from said audio chip in said portable computer to said second audio amplifier and is then only amplified by said second audio amplifier.

9. The method of operating an audio expansion system for a portable computer according to claim 8, further comprising the step of transferring said audio output signal from said audio chip and said signal from said docking station through signal lines of a docking connector that connects said portable computer to said docking station.

10. The method of operating an audio expansion system for a portable computer according to claim 8, further comprised of said signal from said docking station having a voltage level representative of the presence of said second audio amplifier.

11. The method of operating an audio expansion system for a portable computer according to claim 8, further comprising the step of selectively turning said first audio amplifier on and off in response to a driving signal of said controller with a switch.

12. The method of operating an audio expansion system for a portable computer according to claim 8, further comprising the step of providing a microprocessor for operation as said controller.

13. The method of operating an audio expansion system for a portable computer according to claim 8, further comprising the step of providing a digital signal processor for operation as said audio chip.

* * * * *